(12) United States Patent
Bush, III et al.

(10) Patent No.: US 12,364,363 B1
(45) Date of Patent: Jul. 22, 2025

(54) GRIDDLE COOKING STATION AND METHOD THEREOF

(71) Applicant: North Atlantic Imports, LLC, Logan, UT (US)

(72) Inventors: James C. Bush, III, Providence, UT (US); Gary E. Graham, Hyde Park, UT (US); Steve L. Puertas, Wellsville, UT (US); Michael R. Giebel, Joplin, MO (US)

(73) Assignee: North Atlantic Imports, LLC, Logan, UT (US)

( * ) Notice: Subject to any disclaimer, the term of this patent is extended or adjusted under 35 U.S.C. 154(b) by 0 days.

(21) Appl. No.: 19/172,402

(22) Filed: Apr. 7, 2025

Related U.S. Application Data

(63) Continuation of application No. 18/412,693, filed on Jan. 15, 2024, now Pat. No. 12,268,330, which is a continuation of application No. 17/174,334, filed on Feb. 11, 2021, now Pat. No. 11,877,693.

(60) Provisional application No. 62/975,143, filed on Feb. 11, 2020.

(51) Int. Cl.
*A47J 37/06* (2006.01)
*A47J 37/08* (2006.01)

(52) U.S. Cl.
CPC ......... *A47J 37/067* (2013.01); *A47J 37/0871* (2013.01)

(58) Field of Classification Search
CPC .. A47J 37/067; A47J 37/0676; A47J 37/0682; A47J 37/0704; A47J 37/0713; A47J 37/0786; A47J 37/0871
See application file for complete search history.

(56) References Cited

U.S. PATENT DOCUMENTS

| | | | |
|---|---|---|---|
| 2,107,346 A | 2/1938 | Skjerven | |
| 4,899,725 A | 2/1990 | Barron | |
| 5,413,032 A | 5/1995 | Bruno et al. | |
| 5,678,531 A | 10/1997 | Byers et al. | |
| 5,964,145 A * | 10/1999 | Brown | A47J 37/1261 |
| | | | 126/39 J |
| 6,131,505 A | 10/2000 | Lin | |
| 8,051,768 B2 | 11/2011 | Stephen et al. | |
| D694,056 S | 11/2013 | Dahle | |
| 10,568,461 B2 | 2/2020 | Colston et al. | |
| 2003/0041744 A1 | 3/2003 | Stephen et al. | |
| 2007/0175467 A1 | 8/2007 | Liu | |
| 2008/0098902 A1 | 5/2008 | Mansfield et al. | |
| 2008/0245357 A1 | 10/2008 | Meether et al. | |
| 2011/0271947 A1 | 11/2011 | Nilssen | |
| 2011/0283992 A1 | 11/2011 | Demars | |
| 2017/0238758 A1 | 8/2017 | Rummel et al. | |
| 2017/0332838 A1 | 11/2017 | Dahle et al. | |
| 2017/0332839 A1 | 11/2017 | Dahle et al. | |
| 2018/0220845 A1 | 8/2018 | Dahle | |
| 2019/0128538 A1 | 5/2019 | Dahle | |
| 2019/0167039 A1 | 6/2019 | Dahle et al. | |
| 2019/0274476 A1 | 9/2019 | Dahle et al. | |

(Continued)

*Primary Examiner* — Hung D Nguyen

(74) *Attorney, Agent, or Firm* — Foley & Lardner LLP

(57) ABSTRACT

Embodiments of an outdoor cooking station having a main body and a griddle with a hood pivotably coupled to the griddle are provided. For safety purposes, the griddle is removably secured to an upper portion of the main body with the legs of the griddle positioned within apertures defined in an upward facing surface of the upper portion of the main body.

13 Claims, 9 Drawing Sheets

(56) References Cited

U.S. PATENT DOCUMENTS

| | | |
|---|---|---|
| 2019/0298108 A1 | 10/2019 | Dahle et al. |
| 2019/0343331 A1 | 11/2019 | Dahle et al. |
| 2019/0365149 A1* | 12/2019 | Dahle .................. A47J 37/067 |
| 2019/0365152 A1 | 12/2019 | Dahle et al. |
| 2021/0180793 A1 | 6/2021 | James |

* cited by examiner

GRIDDLE COOKING STATION AND METHOD THEREOF

CROSS-REFERENCE TO RELATED APPLICATIONS

This application is a continuation of U.S. patent application Ser. No. 18/412,693, filed Jan. 15, 2024, which is a continuation of U.S. patent application Ser. No. 17/174,334, filed Feb. 11, 2021, which claims the benefit of U.S. Provisional Application No. 62/975,143, filed Feb. 11, 2020, the disclosures of which are hereby incorporated by reference herein in their entirety.

TECHNICAL FIELD

The present invention relates generally to outdoor cooking stations and, more specifically, the present invention relates to a locking component for griddle type cooking stations.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

However, one difference with griddle type cooking from cooking over a grill is that griddles typically are not secured to the cooking station so that the user can properly season and clean the griddle as needed. This non-secured aspect to griddles becomes problematic due to the portable nature of outdoor cooking stations and what users may attempt to do with their cooking stations during transportation or while the griddle is hot. Further, hoods as a feature over grills are common and helpful for accelerating the heating of the food on the grill. Hoods also assist in protecting the grill from the outdoor elements. Hoods as a feature for protecting the griddle of an outdoor cooking station would be desired, but appropriate hood attachment to the cooking station or griddle has also been found problematic, especially in light of the griddle typically being an unsecured component to the cooking station.

BRIEF SUMMARY OF THE INVENTION

The present invention is directed to various embodiments of an outdoor cooking station. In one embodiment, the outdoor cooking station includes a main body, a griddle, and a hood. The main body extends to define a front side, a rear side, a left side and a right side each extending between a lower end and an upper portion, the main body including multiple heating elements controlled along the front side and coupled to the main body. The upper portion of the main body includes a locking structure positioned therealong. The griddle is configured to be supported by the upper portion of the main body, the griddle extending to define an upper side and an underside. The upper side includes a splash guard and the underside includes legs extending downward from the underside of the griddle, at least one of the legs sized and configured to cooperate with the locking structure so as to minimize movement of the griddle relative to the main body. The hood is pivotably coupled to the splash guard of the griddle, the hood configured to be moveable between a closed position and an open position.

In another embodiment, the upper portion of the main body extends with an upward facing surface, the upward facing surface including multiple elongated apertures defined therein such that at least one of the elongated apertures defines a keyed structure sized and configured to engage at least one of the legs of the griddle to prevent upward movement of the at least one of the legs from the keyed structure. In another embodiment, the locking structure includes a bracket, the bracket configured to be secured to the main body with a portion of the bracket at least partially surrounding one of the legs of the griddle so as to prevent horizontal movement of the griddle relative to the main body. In still another embodiment, the locking structure includes elongated apertures defined in an upward facing surface of the main body, the elongated apertures defining a keyed structure configured to cooperate with legs of the griddle so as to prevent upward movement of the legs from the keyed structure.

In another embodiment, the legs of the griddle extend with a length, at least one of the legs defining a recess along the length of the legs, the at least one leg sized and configured to engage the locking structure adjacent the recess defined therein. In another embodiment, the legs of the griddle extend with a length, at least one of the legs defining a neck and an abutment structure along the length of the legs, the abutment structure configured to cooperate with the locking structure. In yet another embodiment, the upper portion of the main body extends with an upward facing surface, the upward facing surface including multiple apertures, each of the apertures sized and configured to receive one of the legs of the griddle for removably locking the griddle to the main body. In another embodiment, the main body extends with an upward facing surface along the upper portion of the main body, the upward facing surface defining apertures therein, each of the apertures sized and configured to receive one of the legs of the griddle, at least two of the apertures extending with an elongated profile.

In accordance with another embodiment of the present invention, an outdoor cooking station is provided. The outdoor cooking station includes a main body and a griddle. The main body extends to define a front side, a rear side, a left side and a right side each extending between a lower end and an upper portion, the main body including multiple heating elements controlled along the front side and coupled to the main body. The upper portion of the main body extending to define an upward facing surface, the upward facing surface defining elongated apertures therein such that two of the elongated apertures define a keyed structure. The griddle is configured to be supported by the upper portion of the main body. The griddle extends to define an upper side and a underside, the upper side including a splash guard and the underside including legs each extending downward from the underside of the griddle such that at least two of the legs define a recess therein and an abutment structure. With this arrangement, the recess and the abutment structure of the at least two legs are sized and configured to cooperate with the keyed structure of the elongated apertures so as to prevent upward movement of the legs from the keyed structure.

In another embodiment, the outdoor cooking station further includes a hood pivotably coupled to the splash guard of the griddle, the hood configured to be moveable between a closed position and an open position. In another embodiment, the hood extends with opposite first and second sides, the first and second sides of the hood pivotably coupled to the splash guard with a first dual linkage and a second dual linkage, respectively.

In another embodiment, the cooking station further includes a bracket, the bracket sized and configured to be secured to the main body with a portion of the bracket at least partially surrounding one of the legs of the griddle to prevent horizontal movement of the legs of the griddle within the elongated apertures. In another embodiment, the elongated apertures include rearward elongated apertures and forward elongated apertures, the forward elongated apertures defining the keyed structure. In still another embodiment, the upward facing surface defines rearward apertures and forward apertures, the forward apertures being the elongate apertures sized with the keyed structure, the rearward apertures and the forward apertures each sized and configured to receive one of the legs of the griddle.

In accordance with another embodiment of the present invention, a method for assembling an outdoor cooking station for minimizing dangerous cooking conditions while cooking is provided. The method includes the steps of: positioning legs of a griddle into elongated apertures defined in an upward facing surface of a cooking station such that the griddle is suspended above heat elements controlled along a front side of the cooking station; moving the griddle so that the legs move from a first end of the elongated apertures to a second end of the elongated apertures, the first end being opposite the second end of the elongated apertures; and maintaining the griddle to the griddle station such that the legs maintain contact with the cooking station and are prevented from moving from the second end of the elongated apertures to the first end of the elongated apertures.

In another embodiment, the maintaining the griddle step includes securing a bracket to the cooking station with a portion of the bracket at least partially surrounding one of the legs to maintain the legs of the griddle adjacent the second end of the elongated apertures. In another embodiment, the maintaining the griddle step includes positioning rearward legs of the legs of the griddle within rearward apertures defined in the upward facing surface of the cooking station.

In another embodiment, the moving the griddle step includes moving forward legs of the legs of the griddle to the second end of the elongated apertures so that the rearward legs of the griddle drop into the rearward apertures to move the griddle in a locked position with abutment structure of the forward legs to prevent upward movement of the forward legs from the forward apertures and the rearward legs in the rearward apertures sized and configured to prevent horizontal movement of the griddle relative to the cooking station. In still another embodiment, the positioning step includes positioning forward legs and rearward legs of the griddle within the elongated apertures such that forward apertures of the elongated apertures define a keyed structure configured to cooperate with the forward legs of the griddle to prevent upward movement of the forward legs from the keyed structure upon the forward legs being positioned adjacent a second end of the elongated apertures. In another embodiment, the positioning step includes positioning the griddle with a hood pivotably coupled to a splash guard of the griddle.

In accordance with another embodiment of the present invention, an outdoor cooking station is provided, the outdoor cooking station including a main body, a griddle, and a hood. The main body extends to define a front side, a rear side, a left side and a right side each extending between a lower end and an upper portion, the main body including multiple heating elements controlled along the front side and coupled to the main body, the upper portion of the main body including a locking structure positioned along an upper side of the main body. The griddle is configured to be supported by the upper portion of the main body, the griddle extending to define an upper side and a underside. The upper side includes a splash guard and the underside includes legs extending downward from the underside of the griddle, at least one of the legs sized and configured to cooperate with the locking structure of the main body. The hood is pivotably coupled to the splash guard of the griddle, the hood being configured to be moveable between a closed position and an open position.

In another embodiment, the splash guard extends upward and along an entire periphery of the griddle. In another embodiment, the hood extends with opposite first and second sides, the first and second sides of the hood pivotably coupled to the splash guard with a first dual linkage and a second dual linkage, respectively. In a further embodiment, the first dual linkage extends between an inner surface of the first side of the hood and an outer surface of the splash guard and the second dual linkage extends between the inner surface of the second side of the hood and the outer surface of the splash guard.

In another embodiment, the legs of the griddle extend with a length, at least one of the legs defining a recess along the length of the legs, the at least one leg sized and configured to engage the locking structure adjacent the recess defined therein. In still another embodiment, the legs of the griddle extend with a length, at least one of the legs defining a neck and an abutment structure along the length of the legs, the abutment structure configured to cooperate with the locking structure.

In another embodiment, the upper portion of the main body extends with an upward facing surface, the upward facing surface including multiple apertures, each of the apertures sized and configured to receive one of the legs of the griddle for removably locking the griddle to the main body. In another embodiment, the main body extends with an upward facing surface along the upper side of the main body, the upward facing surface defining apertures therein, each of the apertures sized and configured to receive one of the legs of the griddle, at least two of the apertures extending with an elongated profile.

In accordance with another embodiment of the present invention, an outdoor cooking station is provided. The outdoor cooking station includes a main body and a griddle. The main body extends to define a front side, a rear side, a left side and a right side each extending between a lower end and an upper portion, the main body including multiple heating elements controlled along the front side and coupled to the main body. The upper portion of the main body extending to define an upward facing surface, the upward facing surface defining two rearward apertures and two forward apertures therein. The forward apertures each define an elongated profile with a narrow profile portion in the elongated profile. The griddle configured to be supported by the upper portion of the main body, the griddle extending to define an upper side and an underside. The upper side includes a splash guard and the underside includes two rearward legs and two forward legs each extending downward from the underside of the griddle. The two rearward legs are sized and configured to be positioned in corresponding ones of the rearward apertures and the two forward legs are sized and configured to be positioned in corresponding ones of the forward apertures. With this arrangement, upon the rearward and forward legs being positioned in the respective rearward and forward apertures, the forward legs are aligned and positioned within the narrow profile portion of the forward apertures.

In one embodiment, the outdoor cooking station includes a hood pivotably coupled to the splash guard of the griddle, the hood configured to be moveable between a closed position and an open position. In another embodiment, the splash guard extends upward and along an entire periphery of the griddle. In still another embodiment, the hood is pivotably coupled to the splash guard of the griddle with a dual linkage such that the dual linkage extends between the hood and the splash guard. In another embodiment, the hood extends with opposite first and second sides, the first and second sides of the hood pivotably coupled to the splash guard with a first dual linkage and a second dual linkage, respectively. In another embodiment, the forward legs of the griddle extend with a length, the forward legs defining a neck and an abutment structure along the length of the forward legs, the abutment structure configured to block upward movement of the griddle with structure defining the narrow profile portion of the elongated profile defined in the upward facing surface of the main body.

In accordance with another embodiment of the present invention, a method for assembling an outdoor cooking station is provided. The method includes the steps of: positioning forward legs of a griddle into forward elongated apertures defined in an upward facing surface of a cooking station such that the griddle is suspended above heat elements controlled along a front side of the cooking station and so that rearward legs of the griddle are positioned on the upward facing surface adjacent rearward apertures defined in the upward facing surface, the griddle having a splash guard extending upward from a periphery of a cooking surface of the griddle; and moving the forward legs of the griddle within the forward elongated apertures to an opposite side of the forward elongated apertures so that the rearward legs move into the rearward apertures to move the griddle in a locked position with abutment structure of the forward legs preventing upward movement of the forward legs from the forward apertures and the rearward legs in the rearward apertures preventing horizontal movement of the griddle relative to the cooking station.

In another embodiment, the method step of positioning includes positioning the griddle with a hood pivotably coupled to the splash guard. In another embodiment, the method step of positioning the griddle with the hood includes positioning the griddle with the hood having a first dual linkage and a second dual linkage each pivotably coupled and extending between a respective first and second side of the hood and the splash guard. In another embodiment, the method step of moving includes moving the griddle linearly so that a neck defined along the forward legs cooperates with structure adjacent the upward facing surface of the main body so as to prevent upward movement of the griddle.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
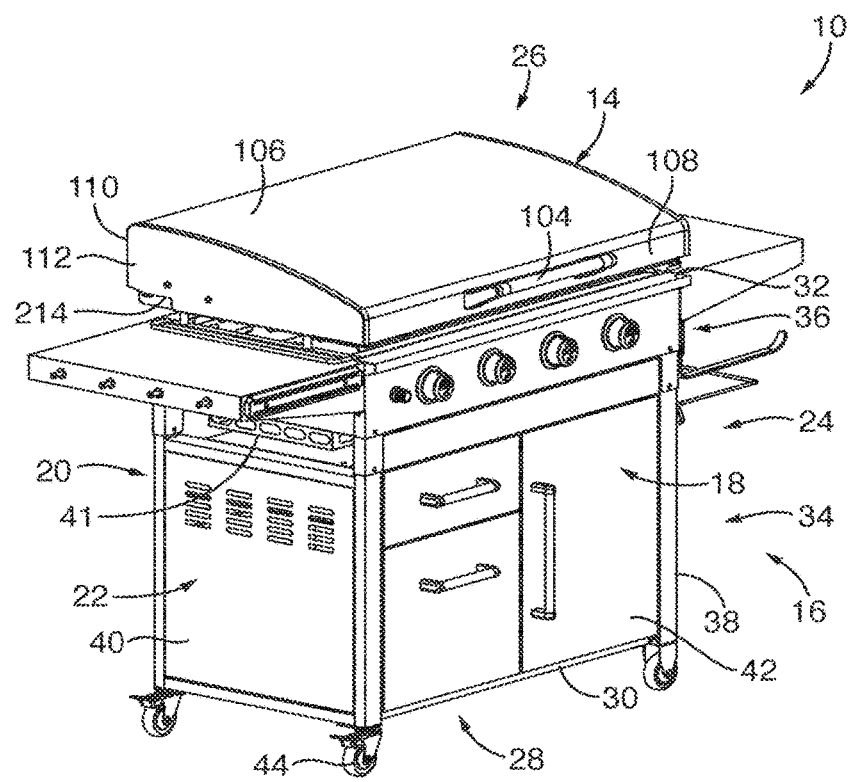
FIG. 1 is a perspective view of a cooking station with a hood in a closed position, according to an embodiment of the present invention.
Figure 2:
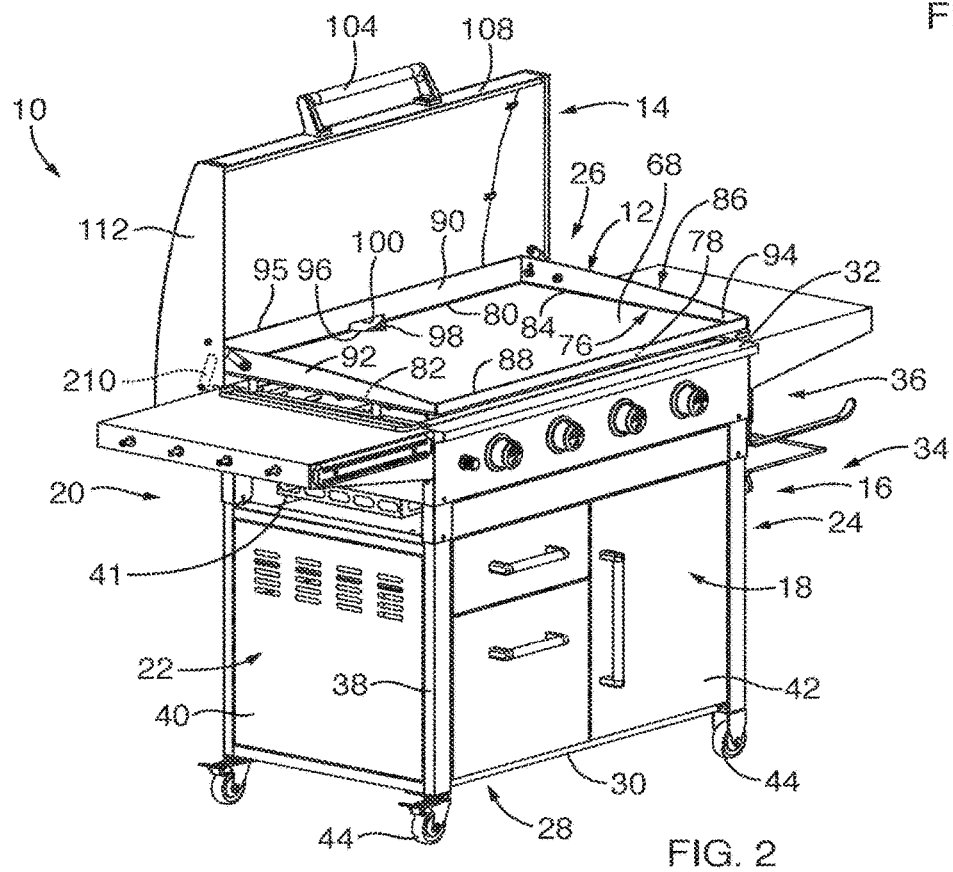
FIG. 2 is a perspective view of the cooking station with the hood in an open position, depicting the hood being pivotably coupled to a griddle, according to another embodiment of the present invention.

Referring to FIGS. 1 and 2, one embodiment of a cooking station 10 with a safety mechanism or locking component for holding and maintaining a griddle 12 to the cooking station 10 is provided. Such cooking station 10 is made for outdoor use and may be sized and configured to be readily moveable such that the cooking station 10 is portable. Further, the cooking station 10 may be of the type that is gas heated, but may also be employed with alternative fuel sources, such as charcoal or another suitable fuel source. In one embodiment, the cooking station 10 may include a hood 14 pivotably coupled to the cooking station 10 such that the hood 14 may move between a closed position and an open position. In a further embodiment, such hood 14 may be pivotably coupled to the griddle 12. With this arrangement, the griddle 12 may be held to the cooking station 10 with the safety mechanism so that the griddle 12 maintains a secured position to the cooking station 10 without being erroneously dislodged with, for example, a gust of wind or other force when the hood 14 is in the open position or while moving the cooking station 10 to a desired location. In this manner, the griddle 12 may be safely maintained to the cooking station 10 with the locking component, discussed further herein.

The cooking station 10 may include a main body 16 extending to define a front side 18, a rear side 20, a first side 22, a second side 24, an upper side 26 and a bottom side 28. The front side 18 may be the side a user may stand for cooking food and operating some of the controls of the cooking station 10. The rear side 20 may be opposite the front side 18 of the cooking station 10. The first side 22 may be opposite the second side 24, and the upper side 26 may be opposite the bottom side 28 of the cooking station 10. The main body 16 of the cooking station 10 may extend between a lower end 30 and an upper end 32 with a lower portion 34 and an upper portion 36 therebetween. Further, the main body 16 may include a frame structure 38 to which various housing or panel structures may be attached. For example, the lower portion 34 of the frame structure 38 may include one or more side panels 40 and/or baffles 41 along the first and second sides 22, 24 of the main body 16. Such side panels 40 and/or baffles 41 may include vents defined therein to vent air into the interior space of the lower and upper portions 34, 36 of the main body 16. Further, the lower portion 34 may include lower front panels 42 in the form of doors or drawers with appropriate coupling structure to provide cabinet like characteristic to the cooking station 10. In this manner, the lower portion 34 may be employed to store various cooking utensils as well as hold, for example, a propane tank (not shown) behind the door of the lower front panels 42. The rear side 20 of the lower portion 34 of the cooking station 10 may also include one or more rear side panels (not shown). Further, the lower portion 34 may include wheels 44, such as two caster wheels and two fixed wheels, coupled to the lower end 30 of the main body 16. In this manner, the cooking station 10 may be readily moveable to a desired location, thereby, providing portability to the cooking station 10 as well as being readily employable for outdoor use at most any desired location.

Figure 3:
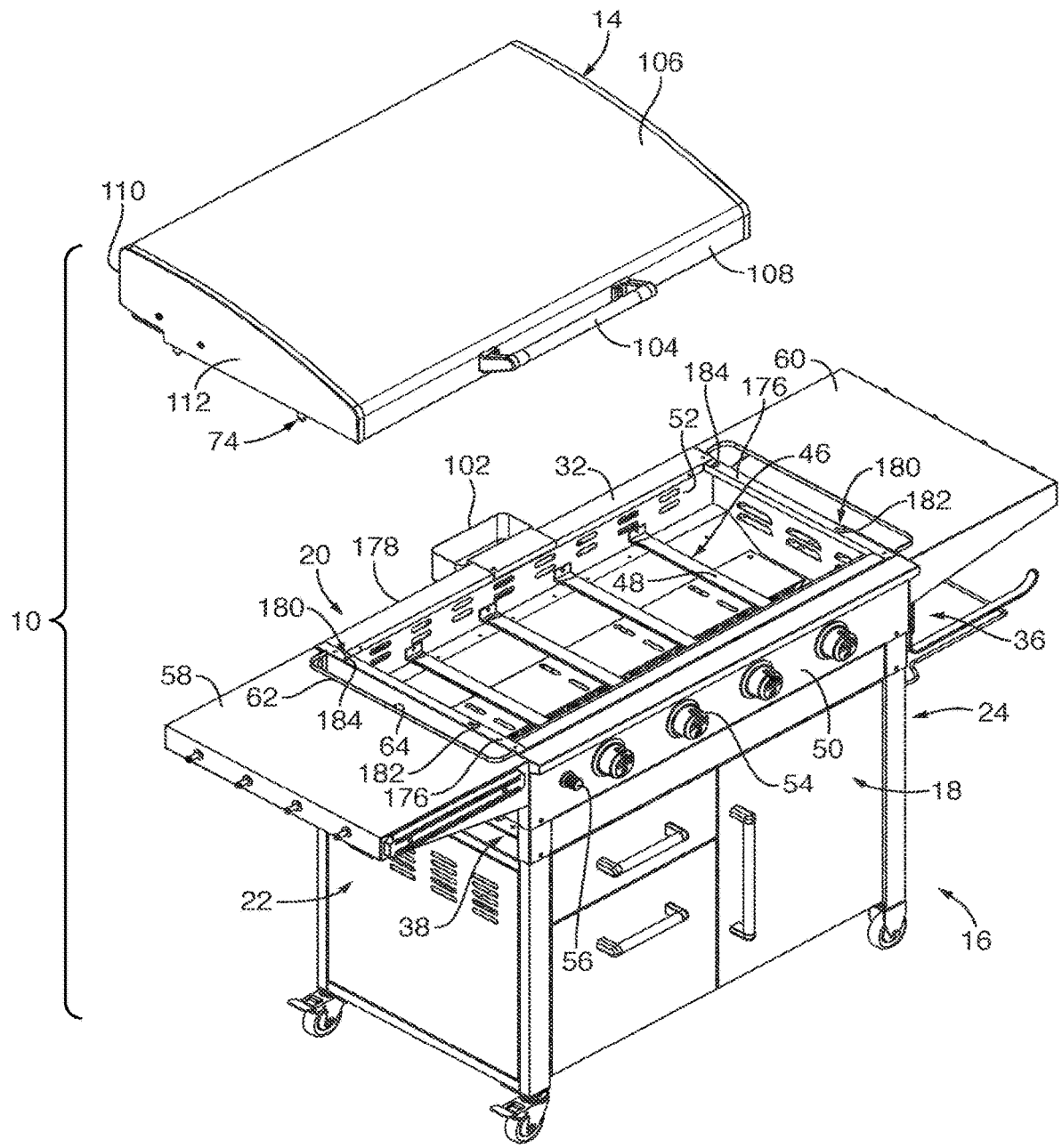
FIG. 3 a perspective view of the cooking station with the griddle and hood separated and positioned above the cooking station, depicting apertures defined in an upward facing surface of the cooking station, according to another embodiment of the present invention.

With reference to FIG. 3, the upper portion 36 of the main body 16 may include the frame structure 38 with various panels sized and configured to house various components and controls of the cooking station 10. For example, the upper portion 36 may include one or more heating elements 46, such as four gas burners 48, extending between a front panel 50 and a rear panel 52, the front panel 50 including various components and controls positioned and secured therewith such that burner knobs 54 may be positioned along an exterior side of the front panel 50. The gas burners 48 may receive fuel by rotating the burner knobs 54 from an off-position to an on-position. Such burner knobs 54 may be coupled to the front panel 50 of the main body 16 and may each be aligned with a corresponding gas burner 48. Each of the burner knobs 54 may include the appropriate valves and components associated therewith configured to control gas being supplied to the gas burners 48, as known to one of ordinary skill in the art. Further, the main body 16 may also include an igniter switch 56. The igniter switch 56 may be positioned on the front panel 50 sized and configured to ignite the particular gas burners 48 corresponding with the burner knobs 54 rotated to the on-position. The gas burners 48 may be fueled with gas, such as propane gas, with a propane gas tank (not shown) or fueled with natural gas, which may be coupled to the gas burners 48 via various components, such as a gas line and connection valve or the like. Although only some of the primary components for operating the cooking station 10 are described herein, the remaining components that may be needed for proper functioning of the cooking station may be incorporated herewith and into the cooking station 10 as known by one of ordinary skill in the art.

Further, the main body 16 of the cooking station 10 may include a first side shelf 58 and a second side shelf 60. The first and second side shelves 58, 60 may be coupled to respective first and second sides 22, 24 of the main body 16 adjacent to the upper end 32 of the main body 16. In some embodiments, the first and second side shelves 58, 60 may be substantially level with the upper end 32 of the main body 16. In other embodiments, the first and second side shelves 58, 60 may be positioned lower than level with the upper end 32 of the main body 16. Each of the first and second side shelves 58, 60 may include a ridge 62 and elongated opening 64 feature extending along or adjacent to an inner side of the respective shelves and extending adjacently between the front and rear sides 18, 20 of the main body 16. This feature of the ridge 62 and the elongated opening 64 may act as a safety feature to assist in minimizing users of the cooking station 10 from placing potentially flammable objects or any object too close to heat emanating from under the griddle 12 (FIG. 2). Further disclosure of the ridge 62 and elongated opening 64 feature is disclosed in commonly assigned U.S. Non-Provisional application Ser. No. 16/364,012, entitled OUTDOOR COOKING STATION, SIDE SHELF, AND METHOD THEREOF, the disclosure of which is incorporated herewith in its entirety.

Figure 4:
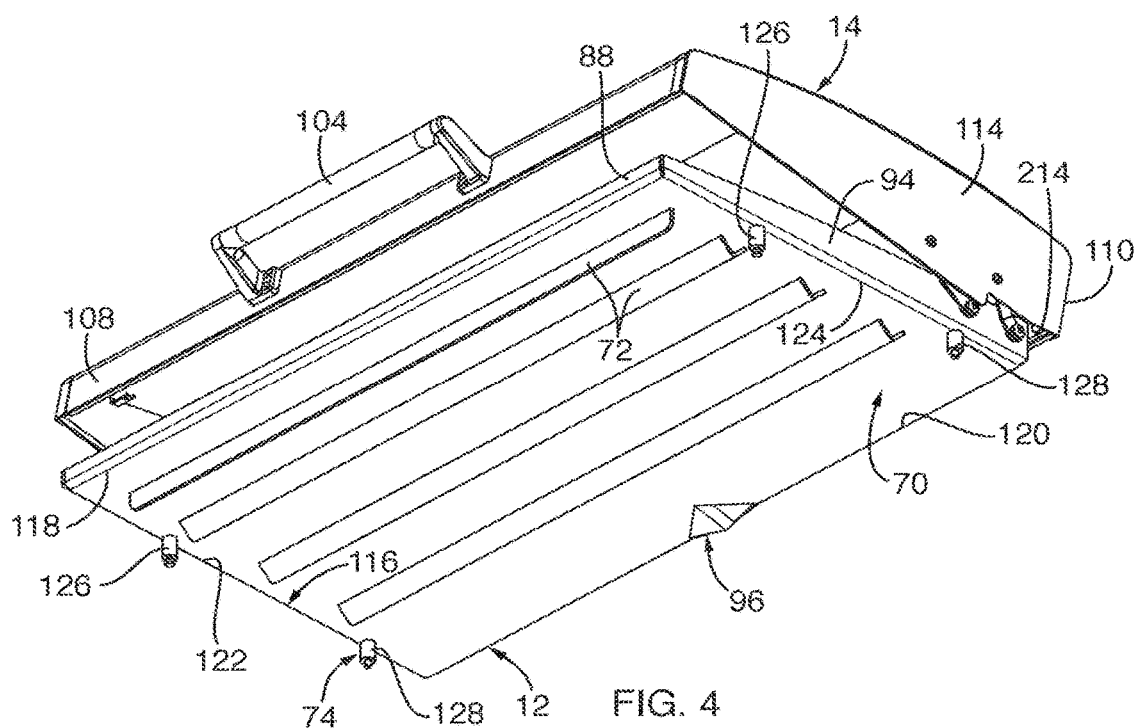
FIG. 4 is a bottom perspective view of the griddle and hood, depicting legs of the griddle, according to another embodiment of the present invention.

Now with reference to FIGS. 2 and 4, as previously set forth, the cooking station 10 may be sized and configured for supporting the griddle 12. The griddle 12 may extend to define a flat plate structure with oppositely facing surfaces: a flat cooking surface 68 and an underside surface 70. As depicted in FIG. 4, the underside surface 70 of the griddle 12 may include multiple elongated structures or ribs 72 sized and configured to be coupled to the underside surface 70 of the griddle 12. Such elongated ribs 72 may act to block heat from bellowing outward from the front side 18 of the griddle 12 and/or assist the plate structure of the griddle 12 to resist high temperature warping of the plate structure. Further, the underside surface 70 of the griddle 12 may include four legs 74 extending downward or away from the underside surface 70 of the griddle 12. Such legs 74 may be fixed and positioned adjacent opposite first and second sides 22, 24 of the griddle 12 and may be appropriately sized and spaced relative to each other to support the griddle 12. Further description of the legs 74 and the locking mechanism or component associated therewith will be set forth herein.

The flat cooking surface 68 of the griddle 12 extends to a periphery 76 or cooking surface periphery such that the periphery 76 and the cooking surface 68 may define a rectangular or square shape. As such, the cooking surface 68 may extend to front and rear peripheries 78, 80 and first and second side peripheries 82, 84 or lengths thereof, each periphery length extending along the periphery 76 of the cooking surface 68. The griddle 12 may include a splash guard 86 extending to define one or more upstanding side walls. In one embodiment, the splash guard 86 may extend upward from the periphery 76 of the cooking surface 68 so as to define a front splash guard 88, a rear splash guard 90, a first splash guard 92 and a second splash guard 94 each of which may be interconnected such that the splash guard 86 extends continuously along the periphery 76 of the cooking surface 68. The front splash guard 88 may directly extend upward from the front periphery 78, and the rear splash guard 90 may directly extend upward from the rear periphery 80. Similarly, the first splash guard 92 may directly extend upward from the first side periphery 82 and the second splash guard 94 may directly extend upward from the second side periphery 84. In one embodiment, the front splash guard 88 may be shorter in height than the rear splash guard 90 and the first and second splash guards 92, 94 may taper in height between the rear splash guard 90 to the front splash guard 88. In another embodiment, the splash guard 86 may extend with a top edge 95 that may extend continuously along each of the front, rear, first and second splash guards 88, 90, 92, 94. In another embodiment, the splash guard 86 may extend partially along the periphery 76 of the cooking surface 68. In another embodiment, the splash guard 86 may extend directly upward from the first and second side peripheries 82, 84 and the rear periphery 80.

The griddle 12 may also extend to define a trough 96 sized and configured to drain grease and unwanted food byproduct from the cooking surface 68 of the griddle 12. In one embodiment, the trough 96 may be positioned adjacent the rear periphery 80 and may define a slope 98 to assist in draining the grease through an opening 100 defined in the griddle 12. Such opening 100 may be at least partially defined in the rear splash guard 90 adjacent the trough 96. Further, in another embodiment, the trough 96 and opening 100 defined in the griddle 12 may be positioned centrally adjacent the rear periphery 80. In another embodiment, the trough 96 and opening 100 defined in the griddle 12 may be positioned along and adjacent at least one of the first side periphery 82 and the second side periphery 84. In another embodiment, the trough 96 and opening 100 defined in the griddle 12 may be positioned along and adjacent two peripheral sides, such as the rear and first side peripheries 80, 82 or the rear and second side peripheries 80, 84. In some embodiments, there may be two troughs 96 each associated with its own opening 100 adjacent two different peripheral sides of the cooking surface 68. In another embodiment, the trough 96 may be elongated to extend along a front side of the periphery 76. Each of the embodiments of the trough 96 may be associated with a grease container 102 (FIG. 3) that may be positioned below the opening 100 and trough 96. Similar grease management systems for a griddle are disclosed in commonly assigned U.S. Non-Provisional patents application Ser. Nos. 16/448,639; 16/448,746, the disclosures of which are incorporated herewith in their entirety.

With reference to FIGS. 1, 2, 3 and 4, as previously set forth, the griddle 12 may be covered by the hood 14. The hood 14 may be pivotably coupled to the griddle 12 so that the hood 14 may remain coupled to the griddle 12 and may be readily moved between a closed position and an open position with a handle 104 coupled to the front side 18 of the hood 14. With the hood 14 oriented in the closed position, the hood 14 may include a top hood wall 106 sized and configured to extend over the cooking surface 68 of the griddle 12 with a front hood wall 108, a rear hood wall 110, a first side hood wall 112 and a second side hood wall 114 each extending downward relative to the top hood wall 106. The front and rear hood walls 108, 110 may extend downward from opposite sides of the top hood wall 106 and may extend parallel relative to each other. The first and second side hood walls 112, 114 may extend downward from opposite sides of the top hood wall 106 and may extend parallel relative to each other. The top hood wall 106 may extend with a curvature so as to slope downward toward the front hood wall 108, such that the front hood wall 108 may be smaller in height than the rear hood wall 110. Further, the first and second side hood walls 112, 114 may taper in height so as to follow the slope of the top hood wall 106. With this arrangement, the hood 14 may be sized so that, upon the hood 14 being in the closed position, the hood 14 may surround the splash guard 86 of the griddle 12. Further, the hood 14 may be pivotably moved between the closed and open positions with the handle 104 that may be coupled to the front hood wall 108. Furthermore, the hood 14 may be pivotably coupled to the splash guard 86 of the griddle 12 such that the hood 14 may pivot between the open and closed positions. Further disclosure of a hood pivotably coupled to a griddle is disclosed in commonly assigned U.S. Non-Provisional application Ser. No. 15/885,313, filed Jan. 31, 2018; and U.S. Non-Provisional application Ser. No. 16/520,744, filed Jul. 24, 2019, which claims priority to U.S. Provisional Application No. 62/703,353, filed Jul. 25, 2018, the disclosures of which are incorporated herewith in their entirety.

Now with reference to FIG. 4, as previously set forth, the legs 74 may extend from the underside surface 70 of the griddle 12. The underside surface 70 may extend to define an underside surface periphery 116, extending to define a rectangular periphery similarly sized as the cooking surface periphery 76 (FIG. 2). Further, the underside surface periphery 116 may extend to define a front underside periphery 118, a rear underside periphery 120, a first side underside periphery 122 and a second side underside periphery 124, the front underside periphery 122 being opposite and parallel to the rear underside periphery 120 and the first side underside periphery 122 being opposite and parallel to the second side underside periphery 124.

In one embodiment, the legs 74 may extend from the underside surface 70 of the griddle 12 with two forward legs 126 and two rearward legs 128, or otherwise said, two forwardly positioned legs and two rearwardly positioned legs. The two forward legs 126 may be closer to the front underside periphery 118 of the griddle 12 than the rear underside periphery 120 of the griddle 12 with one forward leg 126 being adjacent to the first side underside periphery 122 and the other forward leg 126 being adjacent to the second side underside periphery 124. The two rearward legs 128 may be closer to the rear underside periphery 120 of the griddle 12 than the front underside periphery 118 with one rearward leg 128 being adjacent the first side underside periphery 122 and another one of the rearward legs 128 being adjacent the second side underside periphery 124 of the griddle 12.

Figure 5:
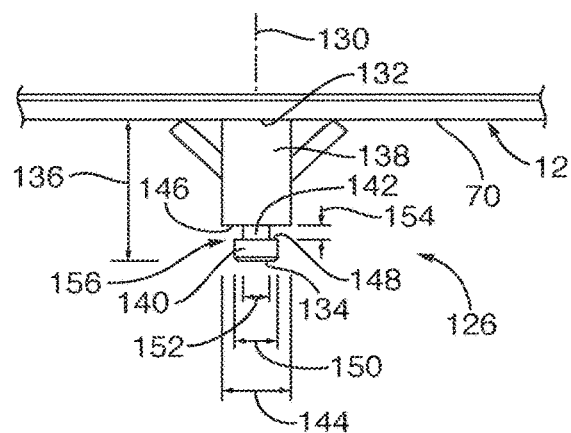
FIG. 5 is an enlarged left side view of one of the legs of the griddle, according to another embodiment of the present invention.

With reference to FIGS. 4 and 5, the forward legs 126 may be an elongated structure each defining a leg axis 130 and extending between a first end 132 and a second end 134 to define a leg length 136. The first end 132 may be coupled to the underside surface 70 of the griddle 12 and the second end 134 may be a free end. The forward legs 126 may each extend with a circular cross-section, but also may exhibit other structural features in the cross-section. The elongated structure and the leg axis 130 of each of the forward legs 126 may be oriented to extend substantially perpendicular relative to the underside surface 70 of the griddle 12. Further, the forward legs 126 may each extend along the length 136 with a base 138 and a head 140 with a neck 142 therebetween. The base 138 of the forward legs 126 may extend to define a first width 144 and may include a first abutment 146, the first abutment 146 being structure along one end of the base 138 that extends to the neck 142. The head 140 may define a second abutment 148 and may extend to the free end and may define a second width 150. The second abutment 148 may be structure of the head 140 extending directly from one end of the neck 142. The neck 142 may define a third width 152 and extend between the first and second abutments 146, 148 to define a neck length 154 therebetween. The first width 144 of the base 138 may be greater than the second width 150 of the head 140 and the third width 152 of the neck 142. Further, the second width 150 of the head 140 may be greater than the third width 152 of the neck 142. As such, the third width 152 of the neck 142 is smaller than both the first and second widths 144, 150 of the respective base 138 and head 140. With this arrangement, the forward legs 126 may extend to define a keyed leg configuration or a keyed leg such that the forward legs 126 may define one or more notches 156 or recesses along the length 136 of the forward legs 126. Such one or more notches 156 or recesses may be sized to extend to structure of the neck 142 of the forward legs 126. The keyed leg configuration may be sized and configured to facilitate, at least in part, locking the griddle 12 to the main body 16 of the cooking station 10, discussed in further detail herein.

Figure 6:
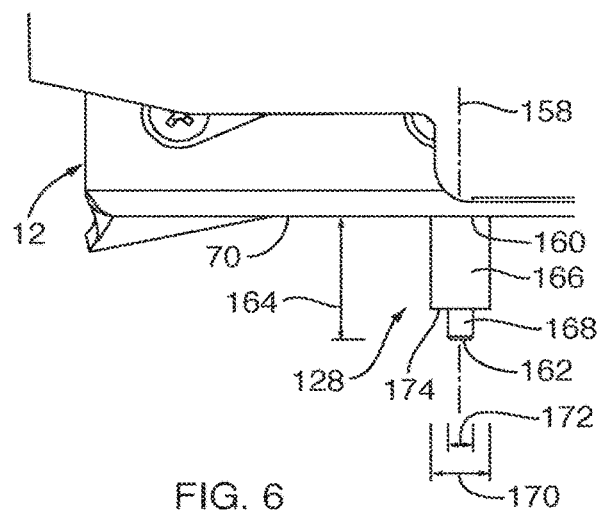
FIG. 6 is an enlarged left side view of one of the legs of the griddle, according to another embodiment of the present invention.

With reference to FIGS. 4 and 6, as previously set forth, the rearward legs 128 may extend adjacent a rearward side of the underside surface 70 of the griddle 12. Similar to the forward legs 126, the rearward legs 128 may be an elongated structure each defining a leg axis 158 and extending between a first end 160 and a second end 162 to define a leg length 164. The first end 160 may be coupled to the underside surface 70 of the griddle 12 and the second end 162 may be a free end. The rearward legs 128 may each extend with a circular cross-section, but also may exhibit other structural features in their cross-section. The elongated structure and leg axis 158 of each of the rearward legs 128 may be oriented to extend substantially perpendicular relative to the underside surface 70 of the griddle 12. Further, the rearward legs 128 may extend with a base 166 and a leg extension 168, the base 166 having a first width 170 and the leg extension 168 having a second width 172. The first width 170 of the base 166 may be greater than the second width 172 of the leg extension 168. In this manner, the rearward legs 128 may extend with a thicker base structure with smaller leg extension 168 or protrusion extending to the free end of the rearward legs 128 such that the base 166 defines a rear leg abutment 174 adjacent the transition between the base 166 and the leg extension 168.

Figure 7:
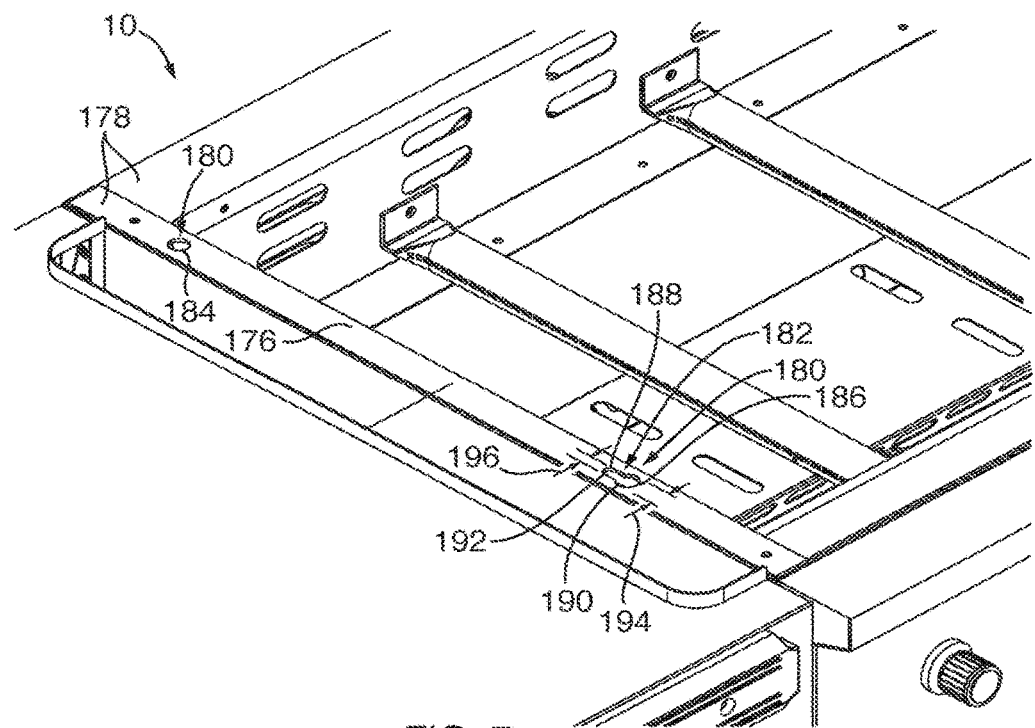
FIG. 7 is an enlarged perspective view of the apertures defined in the upward facing surface of the cooking station, according to another embodiment of the present invention.

With reference to FIGS. 3, 4 and 7, as previously set forth, the upper end 32 or upper portion of the cooking station 10 may extend with an upward facing surface 176. Such upward facing surface 176 may extend along an upper periphery 178 of the cooking station 10 and may include structure for supporting the griddle 12. For example, the upward facing surface 176 may define apertures 180 therein. The apertures 180 may correspond with and be sized and configured to receive the legs 74 of the griddle 12. Further, the apertures 180 may be through holes such that the apertures 180 extend through the upward facing surface 176 that may extend as panel or plate structure of the framework 38 or main body of the cooking station 10.

In one embodiment, the apertures 180 may include two forward apertures 182 and two rearward apertures 184. The forward apertures 182 may be sized and configured to receive the forward legs 126 of the griddle 12. Further, the forward apertures 182 may be elongated and may extend between a first end 186 and an opposite second end 188. Further, the forward apertures 182 may extend to define a first aperture portion 190 and a second aperture portion 192, the first aperture portion 190 being adjacent the first end 186 and defining a first width 194 and the second aperture portion 192 being adjacent the second end 188 and defining a second width 196. The first width 194 may be larger than the second width 196. In this manner, the forward apertures 182 may exhibit an elongated profile with one portion being wider than another portion along the length of its elongated profile. As such, the forward apertures 182 may exhibit a keyed structure or a keyed aperture with structure sized and configured to receive the keyed legs or forward legs 126 of the griddle 12 to minimize upward movement of the griddle 12 relative to the cooking station 10, such as upward movement of the forward legs 126 from the forward apertures 182. The rearward apertures 184 may extend to define a hole or opening in the upward facing surface 176 of the cooking station. Such rearward apertures 184 may each exhibit a circular profile, but also may be square, rectangular, or oval in profile shape. Further, such rearward apertures 184 may be sized and configured to receive the leg extension 168 (FIG. 6) of the rearward legs 128 of the griddle 12.

Figure 8:
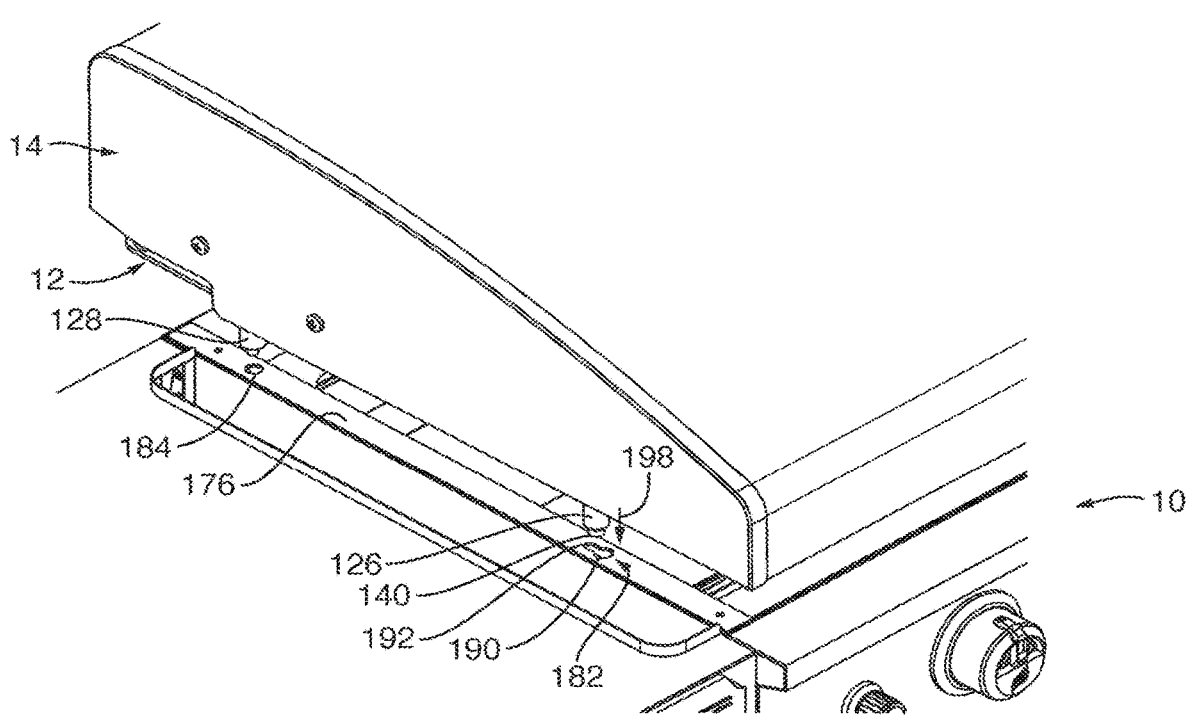
FIG. 8 is an enlarged perspective view of the cooking station, depicting the legs of the griddle positioned adjacent the apertures defined in the upward facing surface of the cooking station, according to another embodiment of the present invention.
Figure 9:
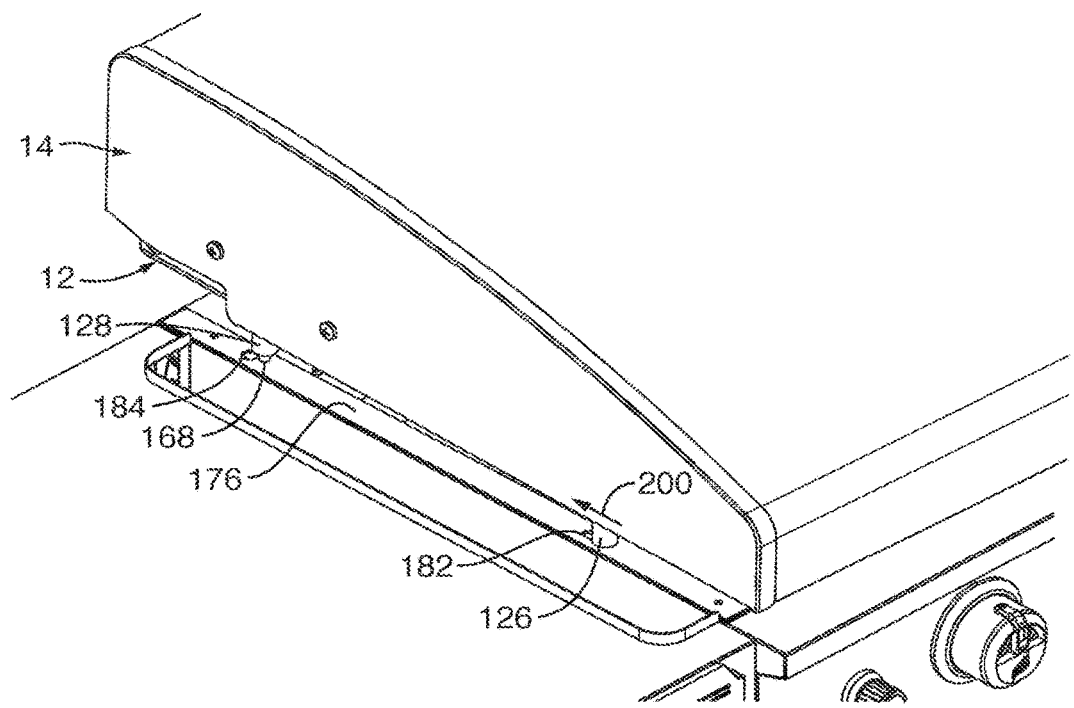
FIG. 9 is an enlarged perspective view of the cooking station, depicting one of the front legs engaged with one of the apertures and one of the rear legs in a non-engaged position, according to another embodiment of the present invention.

With reference to FIGS. 3 and 7-10, description of the griddle 12 being assembled to the cooking station 10 with a locking mechanism configured to removably secure the griddle 12 to the cooking station 10 will now be provided. With reference first to FIGS. 3, 7 and 8, the griddle 12 with the hood 14 pivotably coupled thereto may be positioned so that the legs 74 of the griddle 12 are positioned above the apertures 180 defined in the upward facing surface 176 of the cooking station 10. For example, in one embodiment, the forward legs 126 of the griddle 12 may be positioned directly above the forward apertures 182 of the cooking station 10. In another embodiment, the forward legs 126 may be positioned directly above the first aperture portion 190 of the forward apertures 126 or a wider portion of the forward apertures 182. Now with reference to FIGS. 3, 8 and 9, the forward legs 126 and griddle 12 may then be lowered, as shown by arrow 198, such that the head 140 of each of the forward legs 126 may seat or be received within the first aperture portion 190 or wider portion of the forward apertures 182. With the head 140 of the forward legs 126 positioned within the first aperture portion 190 of the forward apertures 182, the rearward legs 128 may rest on or be positioned above the upward facing surface 176 of the cooking station 10, as depicted in FIG. 9.

Figure 10:
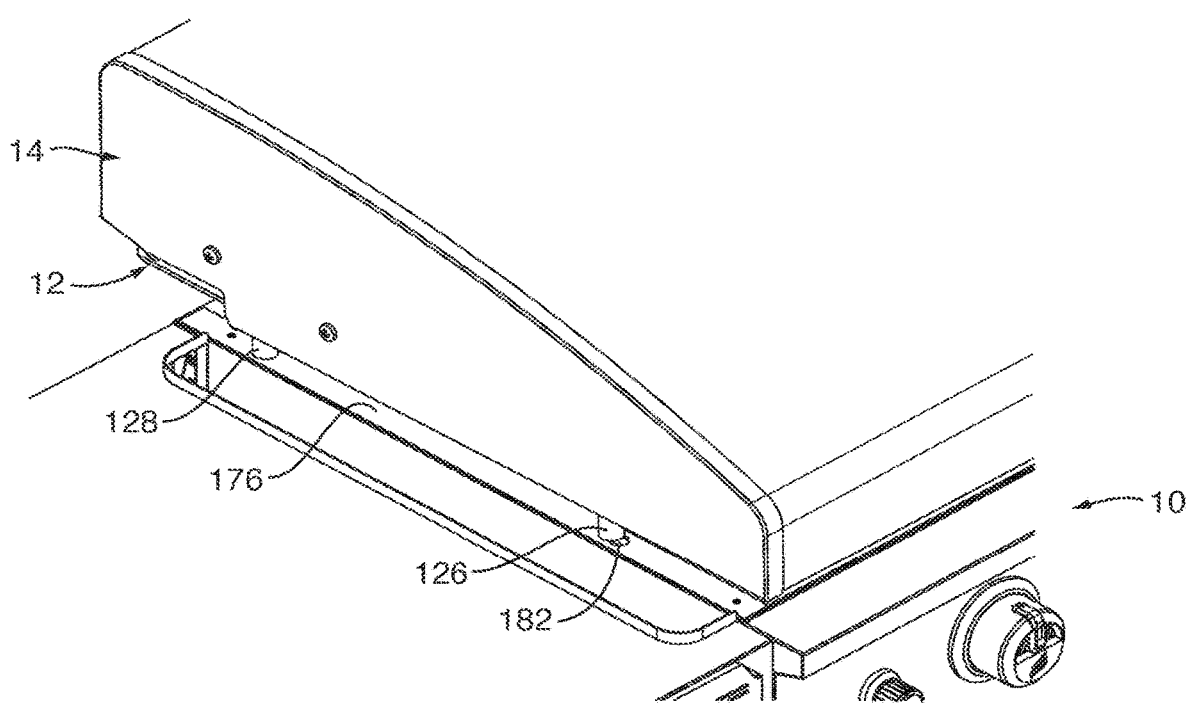
FIG. 10 is an enlarged perspective view of the cooking station, depicting legs of the griddle engaged with the apertures of the cooking station, according to another embodiment of the present invention.

Now with reference to FIGS. 3, 8, 9 and 10, once the forward legs 126 sit within the first aperture portion 190 of the forward apertures 180, the griddle 12 may then be moved rearward, as shown by arrow 200. Such rearward movement of the griddle 12 may move the neck 142 (FIG. 5) of the forward legs 126 to be captured in the second aperture portion 192 of the forward apertures 182 and so that the leg extension 168 of the rearward legs 128 fall within and are received by the rearward apertures 184, as depicted in FIG. 10. In this position, the upward facing surface 176 of the cooking station 10 may support the griddle 12 with the first abutment 146 of the forward legs 126 resting on the upward facing surface 176 of the cooking station 10 and the rear leg abutment 174 resting on the upward facing surface 176 of the cooking station 10 (see FIGS. 5 and 6). Further, in this position, the griddle 12 may be fully assembled and secured with the cooking station 10 with a locking mechanism defined by the keyed leg and keyed aperture arrangement of the respective forward legs 126 and forward apertures 182 in cooperation with the rearward legs 128. For example, such locking mechanism may prevent upward movement of the forward legs 126 from the forward apertures 182 with the second abutment 148 of the forward legs 126 stopping upward movement via the structure defining the second aperture portion 192 of the forward apertures 182. Further, the locking mechanism prevents any lateral or horizontal movement of the griddle 12 relative to the cooking station 10 due to the leg extension 168 of the rearward legs 128 being in the rearward apertures 184. In this manner, the griddle 12 may be assembled and secured to the cooking station 10.

To remove the griddle 12 from the cooking station 10, reverse steps of the assembling process may be employed. For example, unlocking the griddle 12 from the cooking station 10 may be employed by first lifting the rearward legs 128 from the rearward apertures 184 so that the griddle 12 may be slightly tipped forward and then, in the tipped position, moving the griddle 12 forward to move the neck 142 of the forward legs 126 to the first aperture portion 190 of the forward apertures 182. The forward legs 126 may then be lifted upward from out of the forward apertures 182 so that the griddle 12 may be removed from the cooking station 10. As such, the griddle 12 may be removably locked or removably secured to the cooking station 10. With this arrangement, the griddle 12 may be assembled and secured to the cooking station 10 with the locking mechanism and readily unlocked therefrom with a multi-step process so that the griddle 12 can maintain its position on the cooking station 10 in a manner that is unlikely to be unintentionally removed from, for example, a gust of wind catching the hood 14 when in the open position or being dislodged while transporting the cooking station 10.

Figure 11:
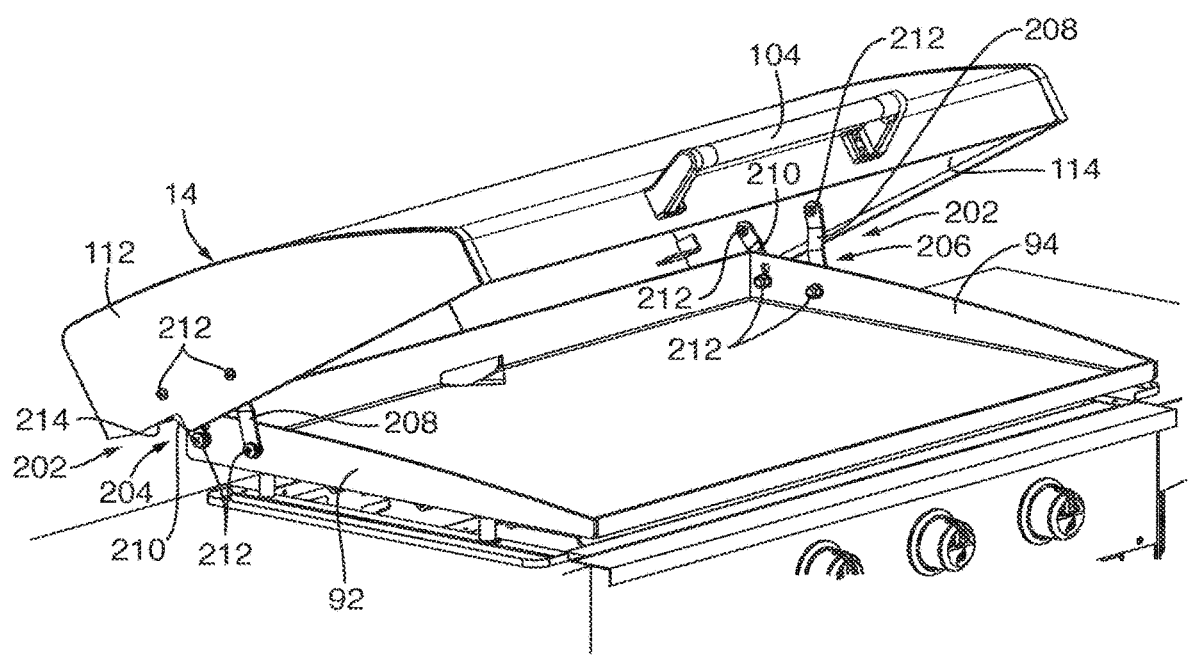
FIG. 11 is an enlarged perspective view of the cooking station with the hood in a partially open position, depicting the hood being pivotably coupled to the griddle with a dual linkage arrangement, according to another embodiment of the present invention.

Now with reference to FIGS. 1, 2 and 11, as previously set forth, the hood 14 may be pivotably coupled to the griddle 12 so that the hood 14 may be moved over the griddle 12 between the closed and open positions, as depicted in respective FIGS. 1 and 2. In one embodiment, the hood 14 may be coupled to the griddle 12 with a dual linkage system 202 at opposite first and second sides 22, 24 of the griddle 12 and adjacent the rear side 20 of the griddle 12 such that the hood 14 may be pivotably coupled to the first splash guard 92 and the second splash guard 94 of the griddle 12. The dual linkage system 202 may include a first dual linkage 204 and a second dual linkage 206, the first dual linkage 204 coupled to the first splash guard 92 and the first side hood wall 112 of the hood 14 and the second dual linkage 206 may mirror the first dual linkage 204 such that the second dual linkage 206 may be coupled to the second splash guard 94 and the second side hood wall 114 of the hood 14. Each of the first and second dual linkages 204, 206 may include a forward linkage 208 and rearward linkage 210. For example, the forward and rearward linkages 208, 210 of the first dual linkage 204 may each be pivotably coupled at one end portion to an external surface of the first side splash guard 92 and at an opposite end portion to an internal surface of the first side hood wall 112 of the hood 14. Similarly, the forward and rearward linkages 208, 210 of the second dual linkage 206 may each be pivotably coupled at opposite end portions with one end portion to an external surface of the second side splash guard 94 and the opposite end portion to an internal surface of the second side hood wall 114 of the hood 14. In this manner, each of the forward and rearward linkages 208, 210 pivot or rotate about pivot points 212 at opposite end portions of each of the forward and rearward linkages 208, 210. Further, the hood 14 may be sized so that the first and second dual linkages 204, 206 may be positioned between the external surfaces of the respective first and second side splash guards 92, 94 and the internal surfaces of the oppositely positioned first and second side hood walls 112, 114.

This dual linkage system 202 facilitates moving the hood 14 to a low profile open position (as depicted in FIG. 2) such that, in the open position, the rearward linkage 210 of each of the first and second dual linkages 204, 206 extends downward (rear linkage 210 of first dual linkage 204 shown with dashed lines). To further facilitate this low profile open position of the hood 14, the hood 14 defines notches 214 (see FIG. 4) along the rearward lower corners of the first and second side hood walls 112, 114 so that the hood 14 can partially sink behind the griddle 12 and cooking station 10. With this arrangement, the hood 14 in the low profile position further assists a user to readily grab the handle 104 for moving the hood 14 from the open position to the closed position.

Furthermore, the low profile open position of the hood 14 may further minimize potential issues of the effects of wind and outdoor cooking with the cooking station 10. Even further, the locking mechanism sized for holding the griddle 12 to the cooking station 10 further minimizes any potential issues of the griddle 12 being erroneously removed from the cooking station 10.

Now with reference to FIGS. 12-16, another embodiment of a locking component or locking feature integrated with an outdoor cooking station 220 is provided. Similar to the previous embodiment, the cooking station 220 may include a griddle member 222 with a hood 224 pivotably coupled to the griddle member 222. The griddle member 222 and hood 224 of this embodiment may be substantially similar to the griddle and hood depicted in the previous embodiment, e.g., shown in FIG. 4. Further, the griddle member 222 may include forward legs 226 and rearward legs 228 with similar or the same leg features as described relative to FIGS. 5 and 6 herein. Such forward and rearward legs 226, 228 may be sized and configured to be inserted into respective forward and rearward apertures 230, 232 each defined in an upward facing surface 234 of a main body 236 of the cooking station 220. For simplification purposes, only one of the forward and rearward apertures 230, 232 and only one of the forward and rearward legs 226, 228 are shown to describe this embodiment, but in this embodiment, there may be two forward and rearward apertures 230, 232 and two of the forward and rearward legs 226, 228. In this embodiment, the forward and rearward legs 226, 228 and the forward apertures 230 may be substantially the same as described and set forth in the previous embodiment. In this embodiment, the rearward apertures 232 may be defined as slots or as an elongated opening 238 within the upward facing surface 234 of the main body 236 of the cooking station 220.

Figure 12:
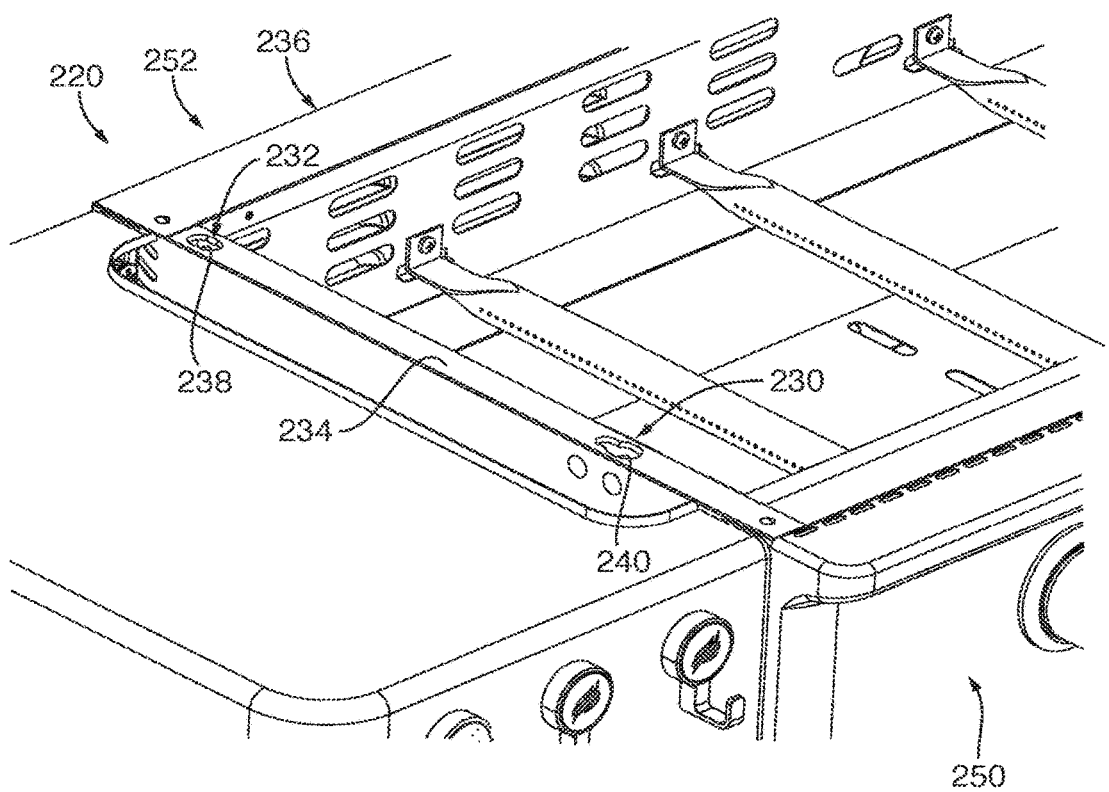
FIG. 12 is an enlarged perspective view of another embodiment of a portion of an outdoor cooking station, depicting a locking feature in the form of apertures defined in and integrated with the cooking station, according to the present invention.
Figure 12A:
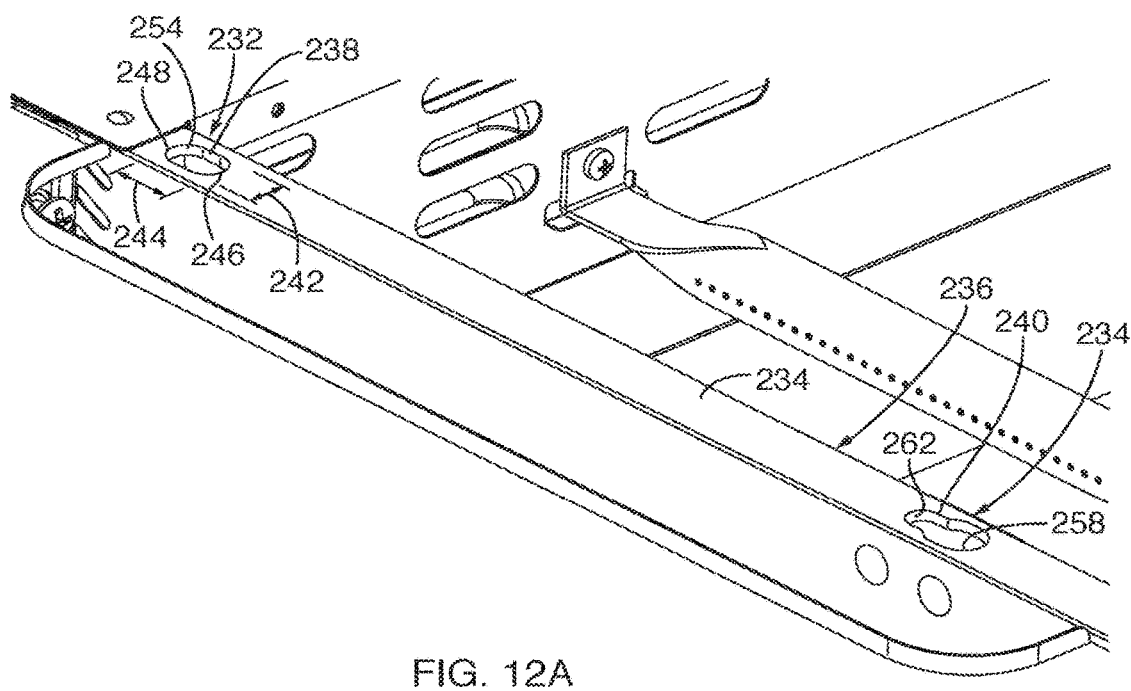
FIG. 12A is an enlarged view of a portion of the outdoor cooking station of FIG. 12, according to the present invention.
Figure 13:
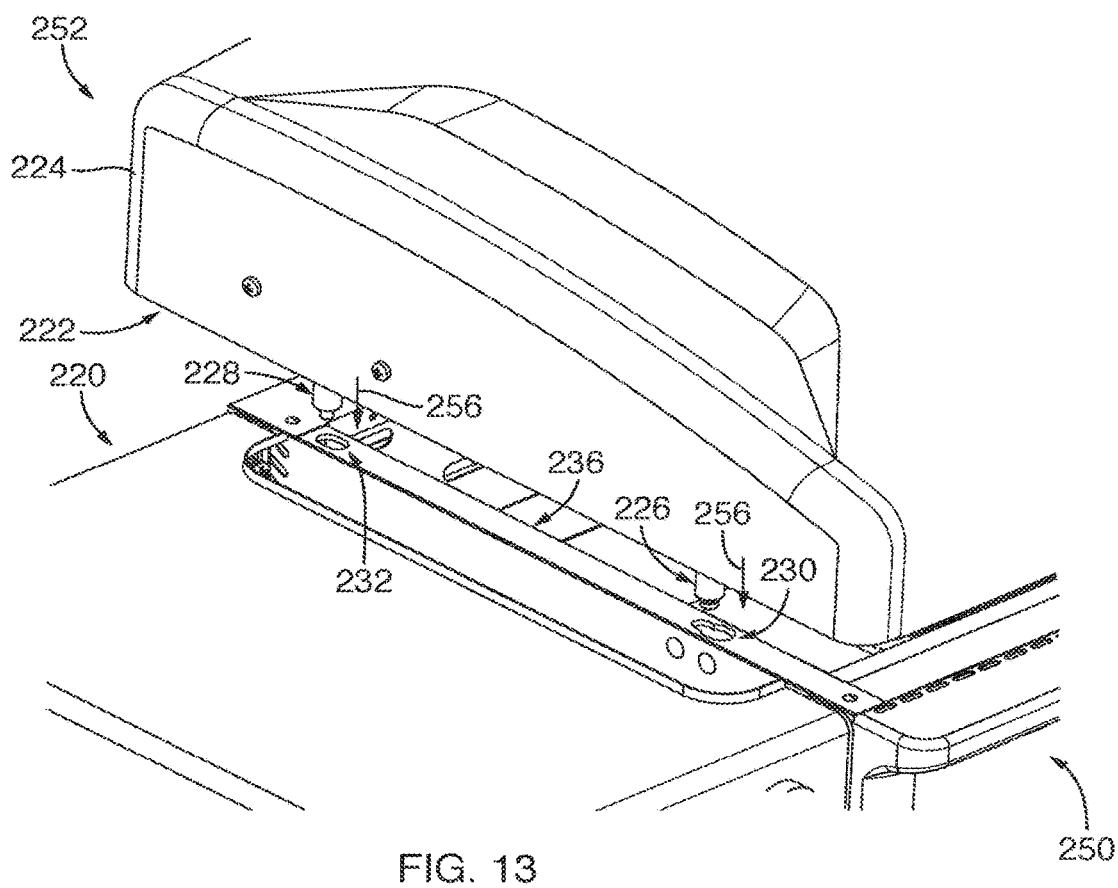
FIG. 13 is an enlarged perspective view of the outdoor cooking station of FIG. 12, depicting a griddle member with legs extending therefrom positioned above the apertures of the locking feature, according to another embodiment of the present invention.

With reference to FIGS. 12, 12A, and 13, as in the previous embodiment, the forward apertures 230 may each define a keyed feature or keyed structure 240, the keyed structure 240 sized and configured to cooperate and engage with one of the forward legs 226. The rearward apertures 232 may extend with an elongated profile or the elongated opening 238 with a width 242 and a length 244, the length 244 extending between a forward end 246 and a rear end 248. The elongated opening 238 may be oriented such that its length 244 extends between a front side 250 and a rear side 252 of the main body 236. The width 242 may be sized and configured to receive the rearward legs 228, such that the width 242 may be greater than a width or diameter of the rearward legs 228. Such rearward legs 228 may best be described and shown relative to FIG. 6. The rearward apertures 232 may define arcuate end portions 254 that may correspond with radial surfaces of the rearward legs 228. Further, the forward and rear ends 246, 248 of the elongated opening 238 may at least partially define the arcuate end portions 254. The length 244 of the rearward apertures 232 may be sized so that the rearward legs 228 may be moved between the forward and rear ends 246, 248 of the elongated opening 238. Further, the length 244 of the elongated opening 238 may extend with a similar length as the keyed structure 240, or forward apertures 230.

Figure 14:
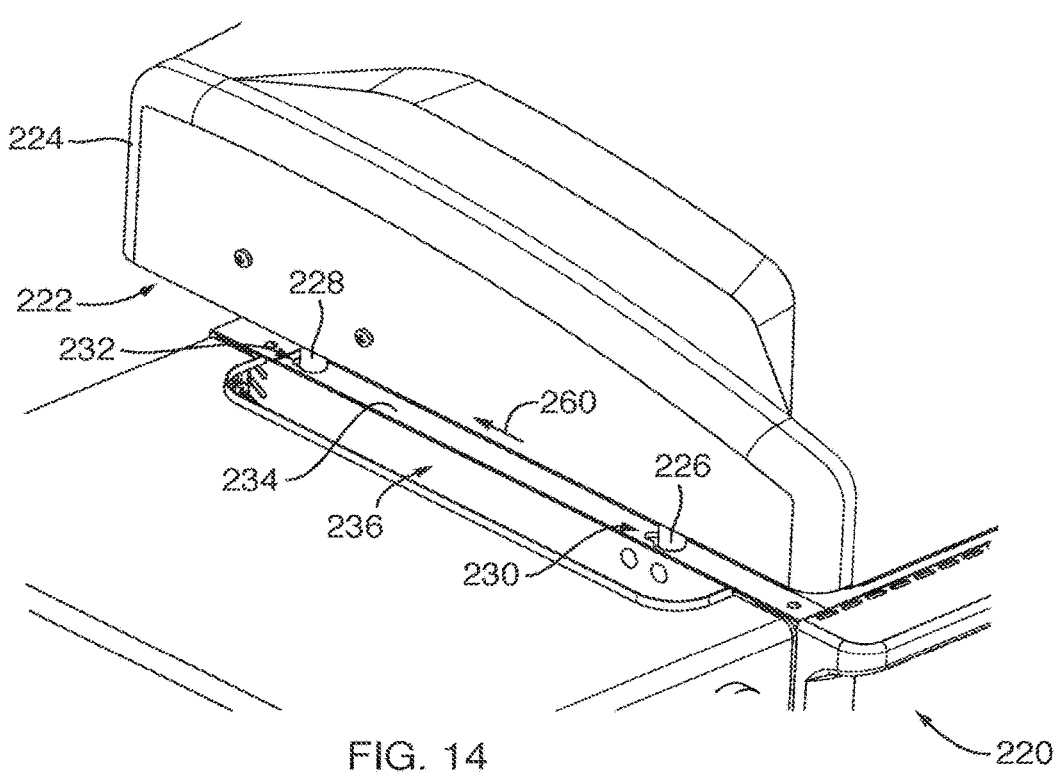
FIG. 14 is an enlarged perspective view of the outdoor cooking station, depicting the legs of the griddle member positioned in the apertures of the locking feature in a first position, according to another embodiment of the present invention.
Figure 15:
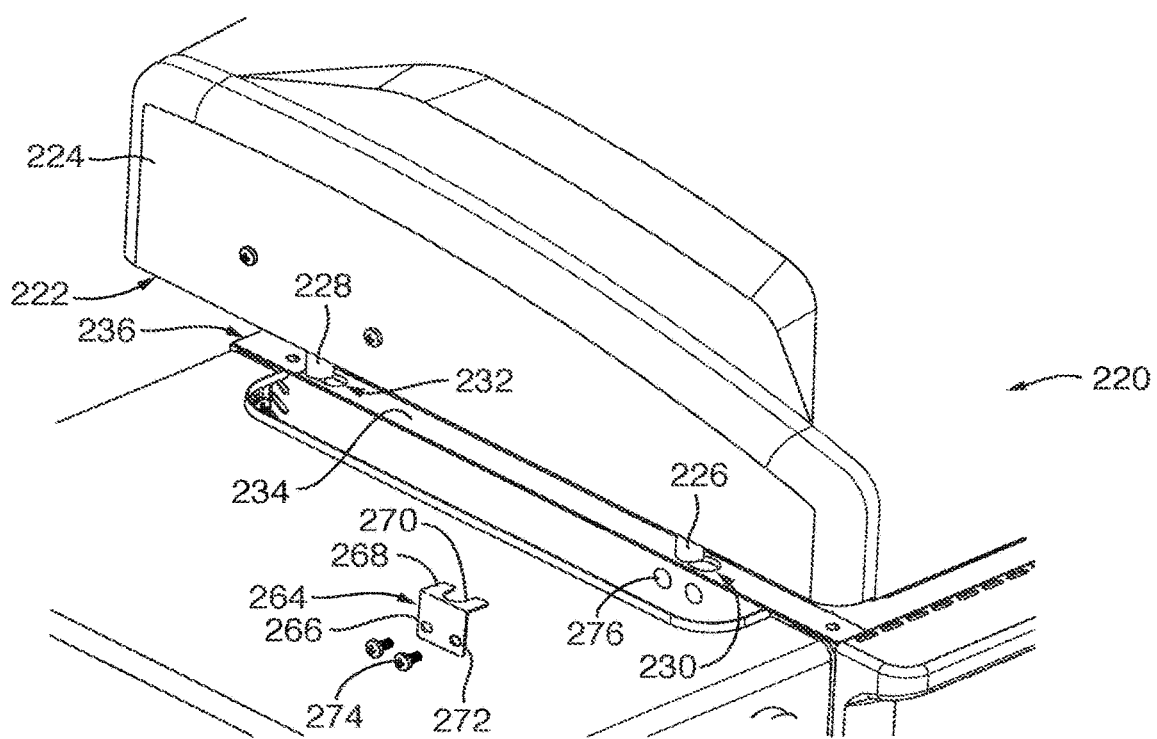
FIG. 15 is an enlarged perspective view of the outdoor cooking station, depicting the legs of the griddle member positioned in the apertures of the locking feature in a second position, according to another embodiment of the present invention.

Now with reference to FIGS. 13-16, a method for securing the griddle member 222 to the main body 236 of the cooking station 220 will now be provided. With reference to FIGS. 12A, 13 and 14, the griddle member 222 may be positioned above the main body 236 so that the forward and rearward legs 226, 228 are positioned above the respective forward and rearward apertures 230, 232. The griddle member 222 may be moved downward so that the forward and rearward legs 226, 228 may move into the respective forward and rearward apertures 230, 232, as shown by downward arrow 256 (FIG. 13). Upon moving the griddle member 222 downward, the forward legs 226 may be positioned within a first portion 258 (FIG. 12A) of the keyed structure 240 and the rearward legs 228 may be positioned within and adjacent the forward end 246 of the rearward apertures 232, as shown in FIG. 14. With such position of the legs in the forward and rearward apertures 230, 232, the griddle member 222 may be moved rearward, as shown by rearward arrow 260 (FIG. 14), so that the forward and rearward legs 226, 228 move rearward within the respective forward and rearward apertures 230, 232, as shown in FIG. 15. As such, the forward legs 226 may be positioned within a second portion 262 (FIG. 12A) or rear portion of the keyed hole 240 and the rearward legs 228 may be positioned adjacent the rear end 248 of the rearward apertures 232.

Figure 16:
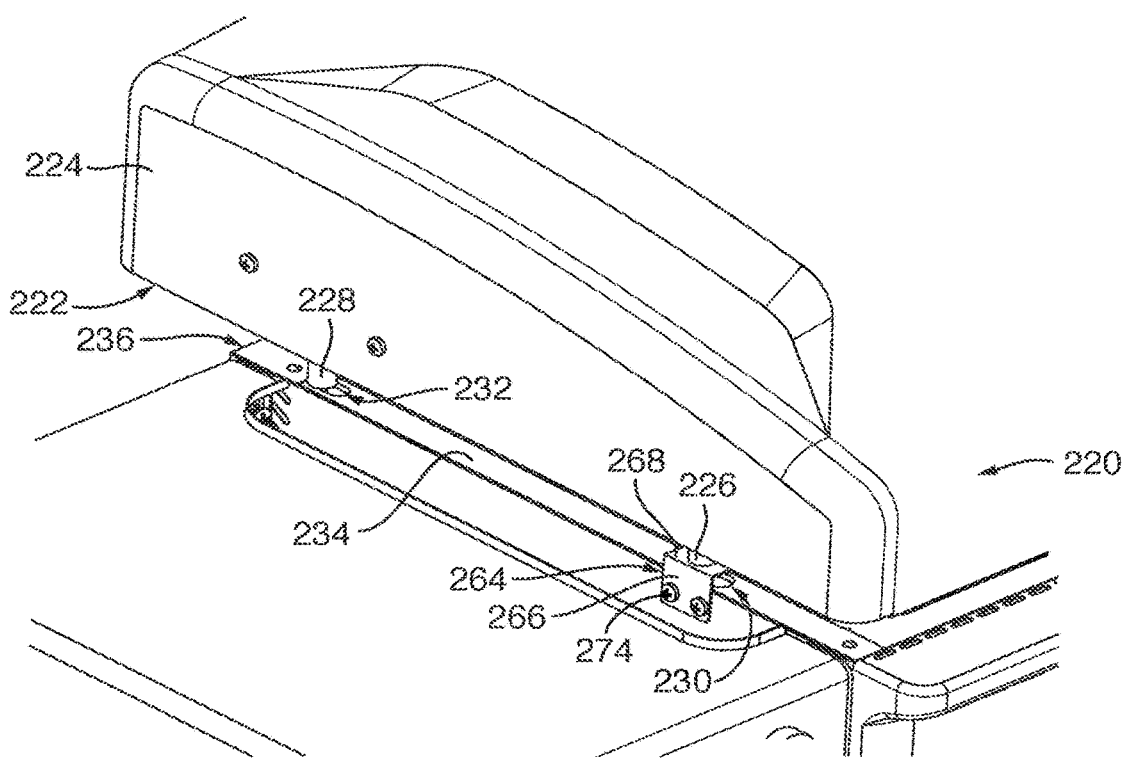
FIG. 16 is an enlarged perspective view of the outdoor cooking station, depicting the griddle member integrated with the cooking station in a locked position with a bracket, according to another embodiment of the present invention.

Now with reference to FIGS. 15 and 16, upon the legs of the griddle member 222 being moved rearward within the forward and rearward apertures 230, 232, as set forth above, the griddle member 222 may be further secured to the main body 236 of the cooking station 220 with a bracket 264. The bracket 264 may be an L-shaped bracket with a base 266 and an extension 268, the extension 268 extending laterally relative to the base 266. The extension 268 may define a notch 270 therein, the notch 270 sized and configured to be positioned at least partially around one of the forward legs 226. Further, the base 266 may include one or more holes 272 sized to receive fasteners 274. Further, the main body 236 may define fastener holes 276 sized for securing the bracket 264 to the main body 236. As such, the bracket 264 may be positioned over the main body 236 so that the one or more holes 272 of the base 266 correspond with the fastener holes 276 of the main body 236 and the notch 270 of the extension 268 of the bracket 264 sits around one of the forward legs 226. The fasteners 274 may then be secured to the bracket 264 and the main body 236 to fixate the griddle member 222 to the main body 236 of the cooking station 220, as depicted in FIG. 16. In this manner, the bracket 264 may at least partially act as the locking feature to minimize horizontal movement of the griddle member 222 relative to the main body of the cooking station 220 or, otherwise said, the bracket 264 may minimize horizontal movement of the legs within the elongated forward and rearward apertures 230, 232. Further, as previously set forth, the forward legs 226 may define structure to cooperate with the keyed structure 240 of the forward apertures 230 to minimize upward movement of the forward legs 226 from the main body 236 of the cooking station 220. In this manner, the keyed structure 220 of the forward apertures 230 may at least partially act as the locking feature to maintain the griddle to the cooking station 220.

The griddle 12 may be manufactured from metallic materials, such as, carbon steel, cast iron, stainless steel, or aluminum, or various metal alloys, or composite layering of materials, or any other suitable cooking surface material known in the art, such as porcelain coated materials. In one embodiment, the metallic materials may be manufactured using cold rolled steel processes, or hot rolled steel techniques, or any other known manufacturing process, such as casting or stamping, as known in the art. The various plate components of the griddle 12 may include a thickness of 5-6 millimeters, but is not so limited, as such thickness of the various components of the griddle may range, for example, between 4-10 millimeters. Also, portions of the griddle 12, such as the trough and splash guards may be formed by employing cutting and bending techniques from sheet or plate material to form the griddle 12 as well as forming portions to the griddle 12 with welding techniques, or employing any other known process or techniques to form the griddle 12, as known by one of ordinary skill in the art.

The various structural components of the various embodiments of the cooking station 10 and the hood 14 and any other structural components thereof may be formed of various metallic materials, such as steel, stainless steel, copper, aluminum or any other suitable material with high temperature ratings, such as various suitable polymeric materials, and may be formed from known structural components, such as sheet metal at various gauges/thicknesses or other known metallic structures, such as tubing or the like, and may be formed and manufactured through various known processes and techniques known in the art, such as casting, welding, rolling, bending, pressing, fastening, etc., as known by one of ordinary skill in the art.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A cooking station, comprising:
 a main body comprising a frame structure, the frame structure comprising:
  an upper surface;
  a first rearward locking feature defined nearer a rear side of the upper surface than a front side of the upper surface; and
  a first forward locking feature defined nearer the front side of the upper surface than the rear side of the upper surface;
 a griddle configured to be supported by the upper surface of the frame structure, the griddle comprising:
  a cooking surface; and
  an underside surface opposite the cooking surface;
 a second rearward locking feature that engages the underside surface of the griddle nearer a rear side of the griddle than a front side of the griddle, wherein the second rearward locking feature extends in a direction away from the underside surface of the griddle, wherein the second rearward locking feature is configured to interface with the first rearward locking feature of the frame structure to restrict movement of the griddle relative to the frame structure in a first direction; and
 a second forward locking feature that engages the underside surface of the griddle nearer the front side of the griddle than the rear side of the griddle, wherein the second forward locking feature extends in the direction away from the underside surface of the griddle, wherein the second forward locking feature is configured to interface with the first forward locking feature of the frame structure to restrict movement of the griddle relative to the frame structure in a second direction.

2. The cooking station of claim 1, wherein the first direction is orthogonal to the second direction, and wherein the second rearward locking feature permits movement in a third direction that is orthogonal to the first direction and the second direction.

3. The cooking station of claim 1, wherein the first rearward locking feature comprises a first opening in the upper surface of the frame structure.

4. The cooking station of claim 3, wherein the first forward locking feature comprises a second opening in the upper surface of the frame structure.

5. The cooking station of claim 3, wherein the second rearward locking feature comprises a protrusion that extends from the underside surface of the griddle and engages the first opening in the upper surface of the frame structure.

6. The cooking station of claim 3, wherein the first forward locking feature comprises a first aperture portion and a second aperture portion, wherein the first aperture portion has a different width size than the second aperture portion.

7. The cooking station of claim 1, wherein the second forward locking feature comprises a first portion having a first width and a second portion having a second width, wherein the first width is larger than the second width.

8. The cooking station of claim 7, wherein the first portion is located toward a distal end of the second forward locking feature, and wherein the second portion is located between the underside of the griddle surface and the first portion.

9. The cooking station of claim 1, wherein the main body extends to define the front side, the rear side, a left side and a right side each extending between a lower end and an upper portion, the main body including multiple heating elements controlled along the front side and coupled to the main body.

10. The cooking station of claim 9, wherein the upper portion of the main body includes the upper surface, wherein the first forward locking feature comprises an elongated aperture defined in the upper surface such that the elongated aperture defines a keyed structure sized and configured to engage the second forward locking feature to prevent upward movement of the second forward locking feature from the keyed structure.

11. The cooking station of claim 10, wherein the second forward locking feature is configured to be secured to the first forward locking feature such that the first forward locking feature surrounds the second forward locking feature to prevent horizontal movement of the griddle relative to the main body.

12. The cooking station of claim 11, wherein the first rearward locking feature comprises a rear aperture in the upper surface, and wherein the rear aperture has a different profile than the elongated aperture defining the keyed structure.

13. The cooking station of claim 1, further comprising a bracket configured to be secure to second forward locking feature and fixate the second forward locking feature relative to the first forward locking feature.

* * * * *